United States Patent
Diaz et al.

(10) Patent No.: US 10,152,604 B1
(45) Date of Patent: Dec. 11, 2018

(54) ENFORCING LOCATIONAL RESTRICTIONS ON STATELESS TRANSACTIONS

(71) Applicant: International Business Machines Corporation, Armonk, NY (US)

(72) Inventors: Fernando J. Diaz, Austin, TX (US); Shawn P. Mullen, Buda, TX (US); Nithya Alagu Renganathan, Austin, TX (US); Elvin Dalipe Tubillara, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/813,282

(22) Filed: Nov. 15, 2017

(51) Int. Cl.
```
G06F 21/62      (2013.01)
H04L 29/06      (2006.01)
G06Q 20/38      (2012.01)
G06Q 20/40      (2012.01)
```

(52) U.S. Cl.
CPC ..... G06F 21/6209 (2013.01); G06Q 20/3829 (2013.01); G06Q 20/405 (2013.01); H04L 63/083 (2013.01); *G06F 2221/2107* (2013.01); *H04L 63/10* (2013.01)

(58) Field of Classification Search
CPC ..... H04L 63/083; H04L 63/10; H04L 9/3268; G06F 21/6209
USPC ......... 455/433, 410–411, 418–420; 713/155, 713/156
See application file for complete search history.

(56) References Cited

U.S. PATENT DOCUMENTS

| | | | |
|---|---|---|---|
| 9,208,335 B2 | 12/2015 | Wu et al. | |
| 2016/0005039 A1 | 1/2016 | Taveau et al. | |
| 2016/0105430 A1* | 4/2016 | Smith | H04L 9/0872 713/171 |
| 2017/0302459 A1* | 10/2017 | Fenner | G06F 19/00 |

OTHER PUBLICATIONS

Hardjono, T. et al.; Anonymous Identities for Permissioned Blockchains, Jan. 20, 2016.
IBM; Method of creating a componentized architecture for unifying resource sharing scenarios in Cloud Computing environment, Feb. 11, 2010.
Anonymously; Cloud Application and Services Orchestration, Apr. 21, 2014.
Anonymously; System and Method to do Policy Encryption for Cloud Based Applications, Nov. 19, 2013.

* cited by examiner

*Primary Examiner* — Congvan Tran
(74) *Attorney, Agent, or Firm* — Garg Law Firm, PLLC; Rakesh Garg; Michael O'Keefe

(57) ABSTRACT

An Attestation Identity Key pair (AIK pair) is created from a hardware identifier of a hardware machine and a geographical location. the AIK pair includes a private AIK and a public AIK. The public AIK and the geographical location are stored in a repository. the public AIK is matched with a key used to sign a data request. A geographical restriction policy corresponding to the geographical location associated with the public AIK is executed. When the geographical restriction policy determines that a type of the data request corresponds to an authorized request type from the geographical location, a service is instructed to process the data request.

20 Claims, 7 Drawing Sheets

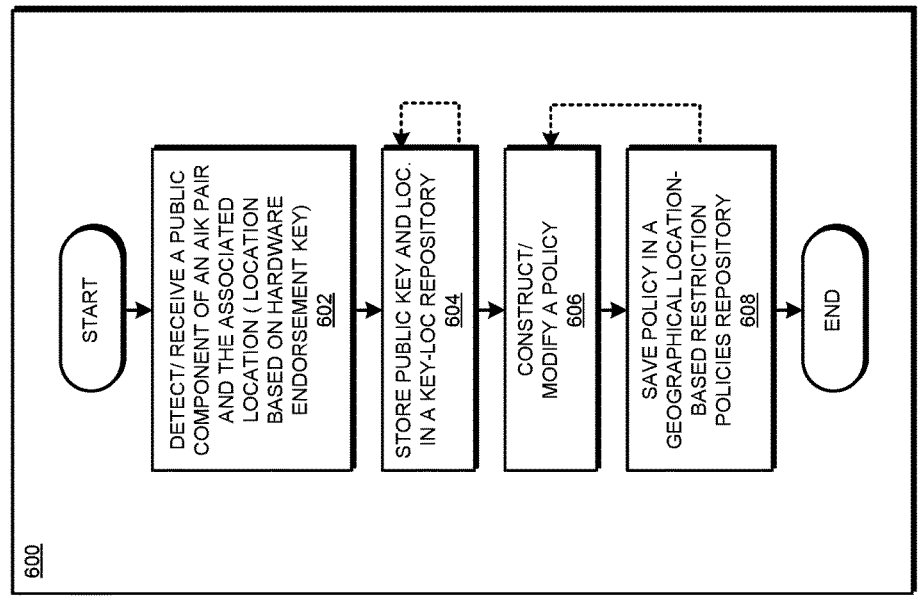

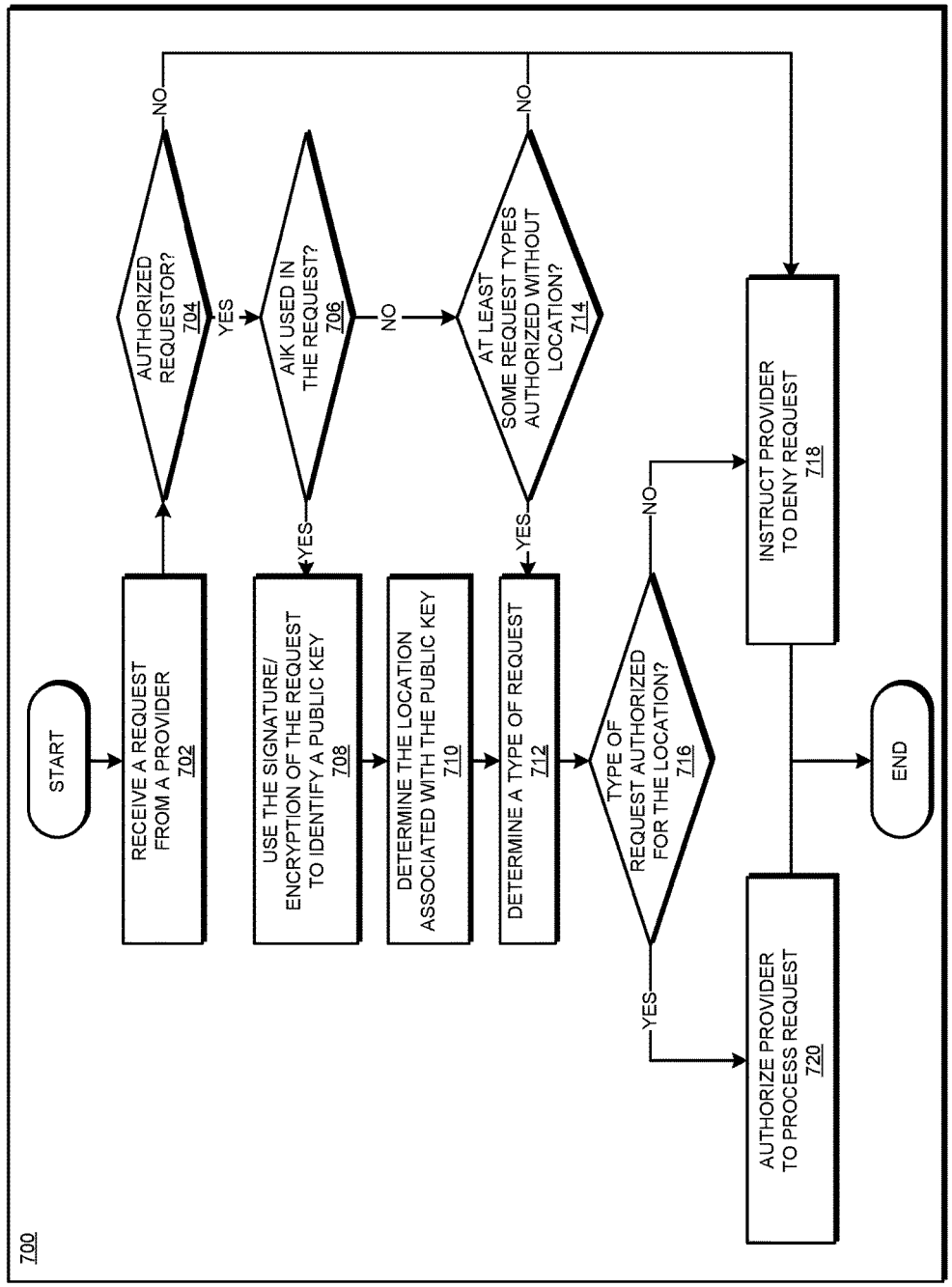

though the present invention relates generally to a method, system, and computer program product for enforcing geographical security of data transactions with or among data processing systems operating in a cloud computing environment. More particularly, the present invention relates to a method, system, and computer program product for enforcing locational restrictions on stateless transactions.

ENFORCING LOCATIONAL RESTRICTIONS ON STATELESS TRANSACTIONS

TECHNICAL FIELD

The present invention relates generally to a method, system, and computer program product for enforcing geographical security of data transactions with or among data processing systems operating in a cloud computing environment. More particularly, the present invention relates to a method, system, and computer program product for enforcing locational restrictions on stateless transactions.

BACKGROUND

Hereinafter, a "transaction" refers to a data transaction. A transaction can be a data request message formed according to some specification, a response message formed according to some specification and containing data, or generally a data communication occurring over a data network between two data processing systems at least one of which is operating in a cloud computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure comprising a network of interconnected nodes. A cloud model may further include any of the at least four deployment models, which are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A system inside the cloud can request a service from another system inside the same cloud. A system inside the cloud can request a service from another system inside a different cloud. A system outside a cloud can request a service from another system inside a cloud.

The request for a service—including but not limited to from a cloud-based system—is generally formed and communicated according to REpresentational State Transfer (REST) architecture. An Application Programming Interface (API) can be RESTful, i.e., compliant with the requirements of REST architecture. An interface is referred to as RESTful if—

(i) Client-server: the interface is implemented in a client-server architecture of a service-provider system (provider or server) and a service-requestor system (requestor or client);

(ii) Stateless: a transaction occurring in the architecture is stateless—i.e., every request to or from a system in the architecture contains all information necessary to understand the request and does not rely on any stored information on a destination system. Any session state information if maintained is maintained on the system originating the request;

(iii) Cacheable—in the architecture, the data within a response to a request is implicitly or explicitly labeled as cacheable or non-cacheable. If a response is cacheable, then a client cache is given the right to reuse that response data for later, equivalent requests;

(iv) Uniform interface—the software engineering principle of generality is applied to the interfaces, thereby simplifying the overall system architecture and improving the visibility of interactions. In order to obtain a uniform interface, multiple architectural constraints are needed to guide the behavior of components. REST is defined by four interface constraints: identification of resources; manipulation of resources through representations; self-descriptive messages; and, hypermedia as the engine of application state. Hypertext (or hypermedia) mean the simultaneous presentation of information and controls such that the information becomes the affordance through which the user (or automaton) obtains choices and selects actions. Hypertext does not need to be HTML (or XML or JSON) on a browser. Machines can follow links when they understand the data format and relationship types.

(v) Layered system—The architecture is implemented in a layered system style composed of hierarchical layers by constraining component behavior such that each component cannot "see" beyond the immediate layer with which they are interacting; and (vi) Code on demand (optional)—client functionality is extensible by downloading and executing code in the form of applets or scripts, thereby simplifying the clients by reducing the number of features that have to be pre-implemented.

A REST transaction is a transaction that occurs using a RESTful interface.

SUMMARY

The illustrative embodiments provide a method, system, and computer program product. An embodiment includes a method that creates new data of an Attestation Identity Key pair (AIK pair) from data of a hardware identifier of a hardware machine and data of a geographical location, the new data comprising a private AIK and a public AIK. The embodiment changes a state of a data storage device associated with a repository by storing the public AIK and the geographical location in the repository. The embodiment matches the public AIK with a key used to sign a data request. The embodiment executes a geographical restriction policy corresponding to the geographical location associated with the public AIK. The embodiment instructs, responsive to the geographical restriction policy determining that a type of the data request corresponds to an authorized request type from the geographical location, a service to process the data request.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a flowchart of an example process for constructing a repository in accordance with an illustrative embodiment; and FIG. 7 depicts a flowchart of an example process for enforcing locational restrictions on stateless transactions in accordance with an illustrative embodiment.

DETAILED DESCRIPTION

Figure 1:
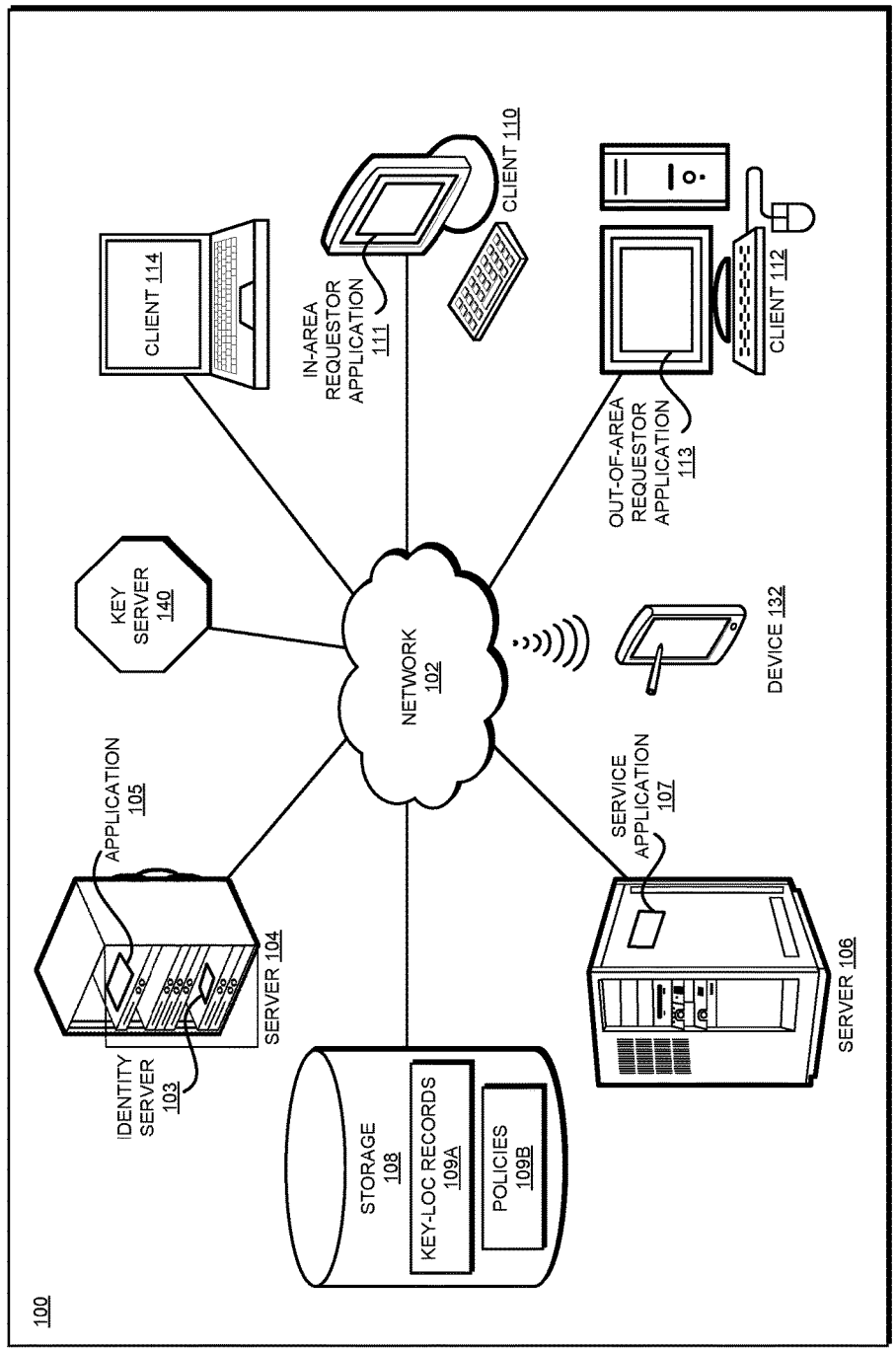
FIG. 1 depicts a block diagram of a network of data processing systems in which illustrative embodiments may be implemented.

The illustrative embodiments recognize that a transaction, including but not limited to a REST transaction, can have geographical restrictions. A geographical restriction is a restriction on the geographical boundary within which the data of the transaction is allowed to travel using a data network.

A transaction in which the data originates from one system, which is physically located in the geographical boundary, and arrives at a system that is also physically located in the geographical boundary is in compliance with the geographical restriction. A transaction in which the data leaves the defined geographical boundary or region in any direction violates the geographical restriction.

In some cases, a transaction in which the data arrives inside the geographical boundary from a system outside the geographical boundary is non-compliant with the geographical restriction. A geographical restriction may, however, allow data from outside a geographical boundary into the geographical boundary within the compliance parameters of the geographical restriction.

In some cases, data leaving the geographical boundary to reach an intermediate system and then arriving back inside the geographical boundary is also non-compliant with the geographical restriction. A geographical restriction may, however, allow data to temporarily reach outside a geographical boundary, but may regard the transaction as compliant so long as the data reaches a final destination inside the geographical.

The illustrative embodiments recognize that with the advent of cloud computing, data and transactions are no longer limited to physical systems within the physical control or a physical location of an entity. A service offered by the entity can be operated on or moved to systems located anywhere on the cloud network, transcending geographical boundaries. A request for the service can similarly come from any geographical location and the resulting data can have a destination any geographical location, again transcending geographical boundaries.

The illustrative embodiments recognize that governance, security, law, and policy often require many geographical restrictions on the movement of data. Therefore, a method of determining the geographical location of a source of a transaction, a destination of a transaction, or both, is needed. Such a method is particularly needed in REST transactions where the transactions are stateless and prior history of locations of the transaction or the transacting systems is either unavailable or useless. The illustrative embodiments recognize that in a REST architecture, the location of the transaction, the transacting systems, the data source and destination, have to be determined on a per-transaction basis, using the contents of the transaction.

The illustrative embodiments recognize that the presently available tools or solutions do not address these needs/problems or provide adequate solutions for these needs/problems. The illustrative embodiments used to describe the invention generally address and solve the above-described problems and other related problems by enforcing locational restrictions on stateless transactions.

An embodiment can be implemented as a software application. The application implementing an embodiment, or one or more components thereof, can be configured as a modification of an existing provider system—i.e., a native application in the provider system, as an application executing in a data processing system communicating with an existing provider system over a short-range radio network such as Bluetooth, over a wired or wireline local area network (LAN)—i.e., a local application on the LAN, as an application executing in a data processing system communicating with an existing provider system over a wide area network (WAN)—i.e., a remote application on the WAN, as a separate application that operates in conjunction with an existing provider system in other ways, a standalone application, or some combination thereof.

A non-limiting example data processing environment configuration, which employs REST architecture, and in which an embodiment can be implemented includes a requestor system, which sends a request for data resulting from the performance of a service. A provider system executes the service that produces the data. The requestor is within a geographical boundary (in-area requestor). The provider is also within the geographical boundary. A second requestor is either outside the geographical boundary, or whose location is not known, or whose location cannot be ascertained (collectively and interchangeably referred to as an out-of-area requestor). An identity server provides user authentication services for requestors and providers in the environment. A key server generates keypairs as described herein. A repository (key-loc repository) that stores records of associations between a key and a geographical location (key-loc record). Another repository that stores a set of geographical restrictions (geographical policy repository).

A keypair includes a public key and a private key. The keypair is usable to sign and authenticate, encrypt and decrypt, or both, in a known manner. For example, a requestor requests a keypair from the key server. The requestor holds the private key from the keypair and the public key can be held by anyone transacting with the requestor. The requestor signs and/or encrypts a transaction with the private key. A provider that receives the transaction uses the public key from the keypair to authenticate the signer of the transaction, decrypt the encrypted transaction, or both.

A geographical restriction can be implemented as a geographical restriction policy. A geographical restriction policy can take the form of logic or code, which when executed causes a computation to occur on the geographical location of an origin of a transaction, a geographical location of a destination of the transaction, or both, and whether all geographical locations related to the transaction satisfy a geographical compliance condition implemented in the logic or code.

An authentications service provided by the identity server can be as simple as a correct login identifier and a password for authenticating a user or system, or a more sophisticated method. A requestor can be authenticated by the identity server in this manner to establish the requestor's authority for requesting certain transactions or data.

A novel method of creating a geographical location-specific keypair and novel functionality for enforcing locational restrictions on stateless transactions using this keypair is now described. Hereinafter, a keypair that has a location component associated therewith, to wit, a geographical location-specific keypair, is referred to as an Attestation Identity Keypair ("AIK pair", a key in this keypair is referred to as "AIK"). A public AIK in the Attestation Identity Keypair is compactly referred to as an AIK+. A private AIK in this keypair is compactly referred to as an AIK−. A server capable of generating keypairs is modified according to an embodiment to generate AIK pairs and perform the related operations as described herein. In one embodiment, a geographical location is encoded within the public AIK of an AIK pair.

A requestor operates in a machine (baremetal machine). Stated another way, regardless of whether the requestor application is executing on a virtual machine or a physical machine, a machine hardware—the baremetal machine—underlies the execution of the requestor at some point.

Most machines include a hardware component called a Trusted Platform Module (TPM). The association between a TPM and a machine hardware is formed at the time of manufacturing of the machine, and is identified by a unique identifier known as an Endorsement key. The endorsement key once formed and associated with the TPM and the machine hardware is immutable.

When a machine hardware is commissioned at a geographical location, e.g., in a datacenter at the geographical location, an embodiment associates the endorsement key with the geographical location. The coupling between the geographical location and the endorsement key remains immutable until the machine is physically moved or relocated.

An embodiment requests a key server, which has been modified to issue AIK pairs, an AIK pair for the TPM. The request for the AIK pair includes the TPM's endorsement key and the coupled location. The TPM receives a TPM−, which is an AIK− for the TPM. The key server sends the TPM+ and the associated location to an embodiment. The embodiment creates a key-loc record in the key-loc repository by storing the TPM+, which is the AIK+ of the TPM, along with the location associated with the endorsement key of the TPM, in the key-loc repository.

A requestor operating on the machine with the TPM sends the request to the TPM for signing or encryption. The TPM of the machine signs the request, encrypts the request, or both, with the TPM's TPM− and returns the signed and/or encrypted request to the requestor.

The requestor uses the identity server to obtain an authentication code (auth code). The requestor provides the credentials used by the identity server, and if the credentials presented by the requestor are valid, the identity server issues the auth code.

The requestor sends the signed and/or encrypted request to a provider along with the auth code. Note that the request still complies with REST architecture—the request is stateless because the signing and encryption are themselves not a part of the request therefore the unchanging nature of the AIK pair and the storing of the AIK+ in the key-loc repository has no effect on the state of the transaction. The keys are used in their traditional operation simply to protect the transaction, and in the novel operation according to the illustrative embodiments to associate the transaction with a location.

A provider receives the request and the auth code from the requestor. The provider can optionally validate the auth code from the identity server. For example, the provider can supply the identity server the auth code and in response receive an affirmative or negative confirmation on whether the requestor is authorized for the transaction contemplated in the request.

Upon affirmation of the auth code, the provider sends the signed/encrypted request to an embodiment. The embodiment uses the TPM+ of a key-loc record in the key-loc repository to verify the signature, decrypt the request or both. The embodiment uses the location from the key-loc record to executes one or more geographical restrictions from the policy repository. The execution of the one or more geographical restriction policies determines whether the transaction contemplated in the request is permitted from that location. If the transaction is permitted from that location, the embodiment sends an instruction to the provider to process the verified/decrypted request. If the transaction is not permitted from that location, the embodiment sends an instruction to the provider to reject or deny the request.

Most in-area and out-of-area requestors are processed in this manner. It is possible in some cases that an in-area or out-of-area requestor may send a request without having the TPM in its system obtain an AIK pair, without using the TPM to sign or encrypt the request, or both. While the authentication feature of the identity server prevents unknown or undesirable requestors from sending requests, mere authentication is insufficient to ensure location compliance even by authorized requestors.

When a provider receives a request where the requestor cannot be authenticated, the provider can simply refuse to process the request. But when a provider receives a request that appears to have a valid auth code, the provider passes the request to an embodiment. The request may be signed/encrypted but the public key may not have been stored in the key-loc repository because the TPM on the requestor's machine did not go through the process of obtaining an AIK pair. When the request is signed/encrypted, the embodiment determines whether a public key that corresponds to the signature or encryption of the request is present in the key-loc repository. If the signature or encryption of the request is not present in the key-loc repository, the embodiment can obtain the corresponding public key from the key server and verifies/decrypts the request. If the request was not signed or encrypted, the embodiment proceeds directly to the policy enforcement step.

In the policy enforcement step, the embodiment determines whether a policy exists that allows at least some types of requests to be processed without knowing the geographical location information about the requestor. If such a policy is found in the policy repository, the embodiment determines whether the request actually is of one of the locationally unrestricted types of requests. If the request is of a permitted type according to the policy, the embodiment sends an instruction to the provider to process the verified/decrypted request. If the request type is not permitted by the policy without location information, or if no policy exists for requests without location information, the embodiment sends an instruction to the provider to reject or deny the request.

The manner of enforcing locational restrictions on stateless transactions described herein is unavailable in the presently available methods. A method of an embodiment described herein, when implemented to execute on a device or data processing system, comprises substantial advancement of the functionality of that device or data processing system in enforcing locational restrictions on stateless transactions.

The illustrative embodiments are described with respect to certain types of requests, keys and keypairs, hardware components, auth codes, repositories, records, configurations, locations, data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
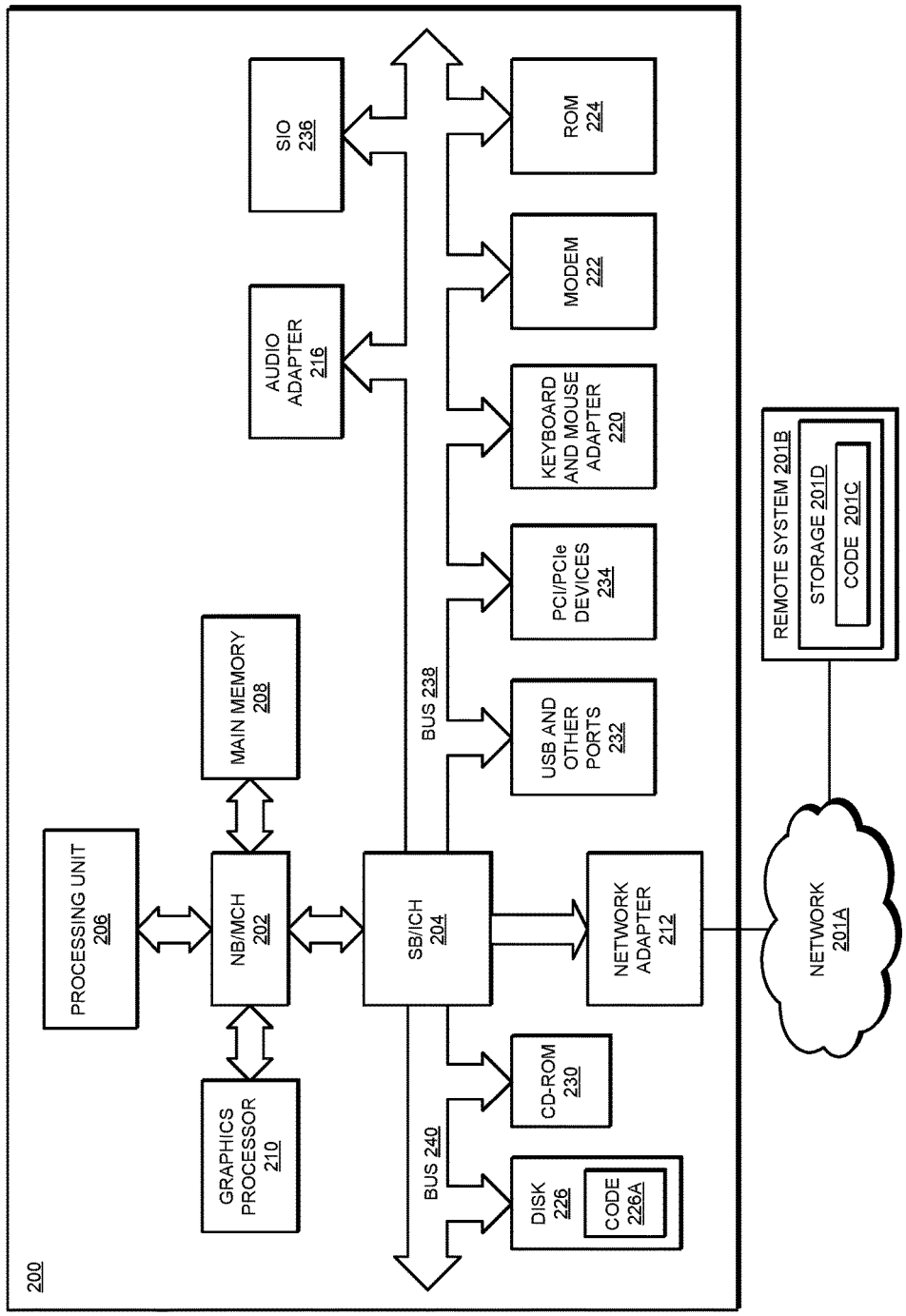
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Identity server 103 provides the authentication services and auth codes as described herein. Application 105 implements an embodiment described herein. Key server 140 implements a modified service for generating AIK pairs as described herein. Service application 107 is a provider system as described herein. Requestor application 111 is an in-area requestor, and requestor application 113 is an out-of-area requestor as described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
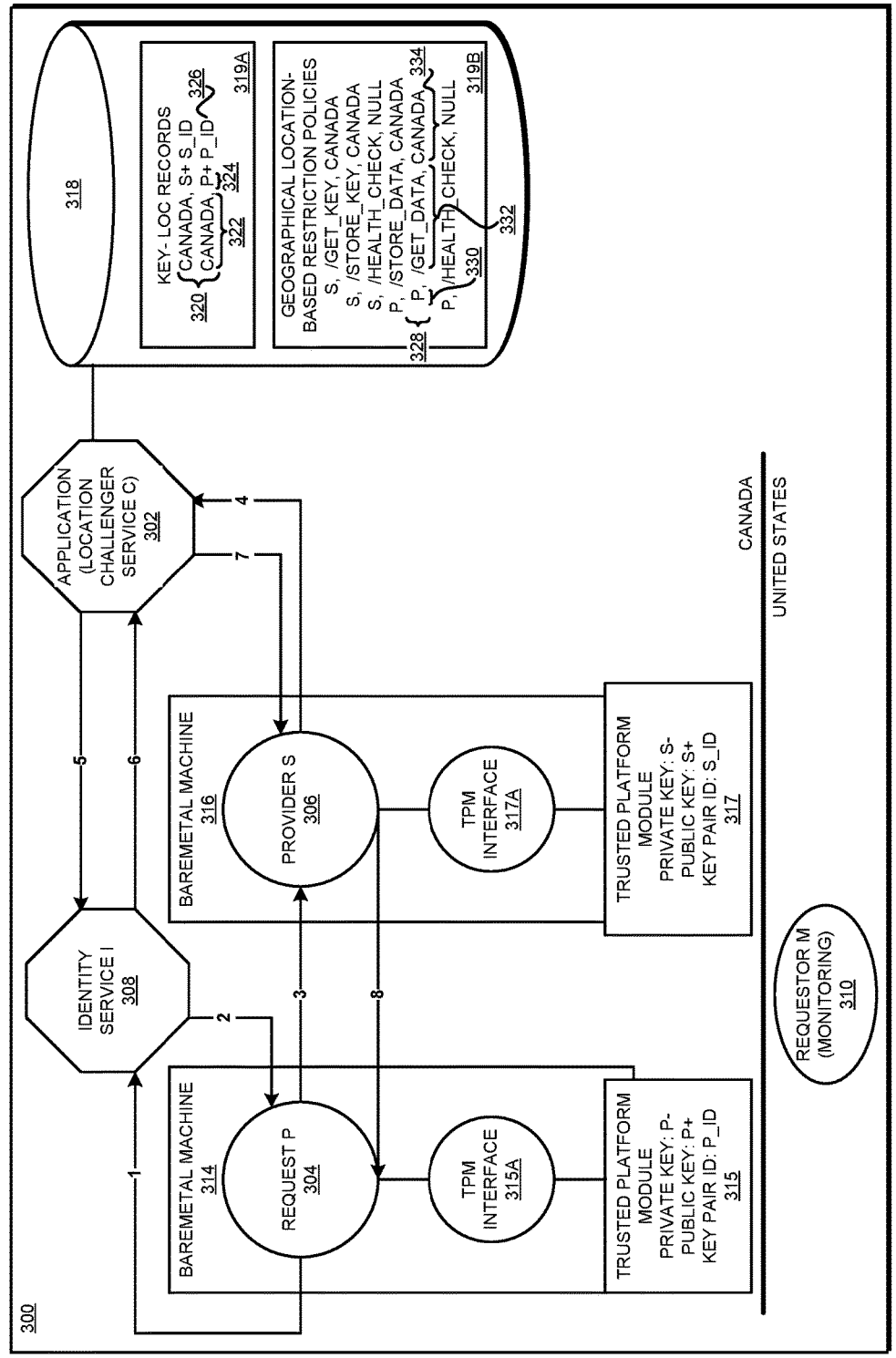
FIG. 3 depicts a block diagram of an example operation for enforcing locational restrictions on stateless transactions in accordance with an illustrative embodiment.

With reference to FIG. 3, this figure depicts a block diagram of an example operation for enforcing locational restrictions on stateless transactions in accordance with an illustrative embodiment. Configuration 300 includes application 302 (application C), which is an example of application 105 in FIG. 1. Application 304 (requestor P) is a requestor in the manner of in-area requestor 111 in FIG. 1. Application 306 (provider S) is a provider in the manner of out-of-area requestor 113 in FIG. 1. Identity service (service I) is an example of an authentication service provided by identity server 103 in FIG. 1.

Assume that requestor P and provider S operate in Canada, which forms an example defined geographical boundary or area. Application 310 (requestor M) is an out of-area requestor operating on a baremetal machine in the United States, which is outside the defined geographical boundary of Canada. Note that a geographical boundary can be defined in any suitable manner including but not limited to known borders or landmarks, marked points, or a set of coordinates on a map.

Requestor P operates in or using baremetal machine 314, which includes TPM 315. Requestor P sends unsigned/unencrypted requests to TPM 315, and receives signed/encrypted request back from TPM 315 via TPM interface 315A. TPM 315 has already obtained AIK pair P+ and P− as shown. Keypair (P+, P−) is identified using a keypair identifier P_ID.

In a similar manner, provider S operates in or using baremetal machine 316, which includes TPM 317. Provider S sends unsigned/unencrypted requests to TPM 317, and receives signed/encrypted request back from TPM 317 via TPM interface 317A. TPM 317 has already obtained AIK pair S+ and S− as shown. Keypair (S+, S−) is identified using a keypair identifier S_ID.

Note that TPM 315 may obtain a single keypair to be used with all requestors in machine 314, different keypairs for use with different requestors in machine 314, multiple keypairs for use with one requestor, or n keypairs for use with m requestors in machine 314. In the depicted configuration, assume that TPM 315's keypair (P+, P−) is usable with requestor 304. TPM 317 may also hold one or more AIK pairs for one or more providers in machine 316 in a manner similar to TPM 315.

Requestor P presents appropriate credentials to identity service I (step 1). Identity service provides requestor P an auth code (step 2). Requestor P obtains the signed/encrypted request from TPM 315 before or after steps 1-2.

Requestor P sends the signed/encrypted request and auth code to provider S (step 3). Provider S sends the signed/encrypted request and auth code to application 302 (step 4). Application 302 verifies requestor P's identity by sending the auth code to identity service I (step 5). Identity service I affirms the identity (step 6).

Before steps 5-6, during steps 5-6, or after steps 5-6, application 302 refers to repository 318 for location enforcement. Specifically, application 302 determines whether a key-loc record exists in key-loc records 319A in repository 318, which provides a location with a P+ key corresponding to the P− key used on the request. Assume that key-loc record 320 is present in records 319A. Record 320 provides location 322 (Canada) for AIK+324 (P+), and optionally AIK pair identifier 326 (P_ID) as a non-limiting method of establishing the correspondence between P+ and P−.

Application 302 also attempts to find one or more policies in geographical restriction policies 319B that apply to the request from requestor P. For example, policy 328 provides that if a requestor 330, presents a request type 332, from within geographical boundary 334, the request is permitted. Assuming that the present request from requestor P is a GET_DATA type of request, according to policy 328, the present request qualifies for processing. If the request is of a type that is not found in any policy, the request is not permitted.

Accordingly, application 302 instructs provider S to process the request (step 7). Optionally, application 302 also provides the decrypted and verified request to provider S in step 7 as well. Provider S sends the data resulting from processing the request to requestor P (step 8).

Figure 4:
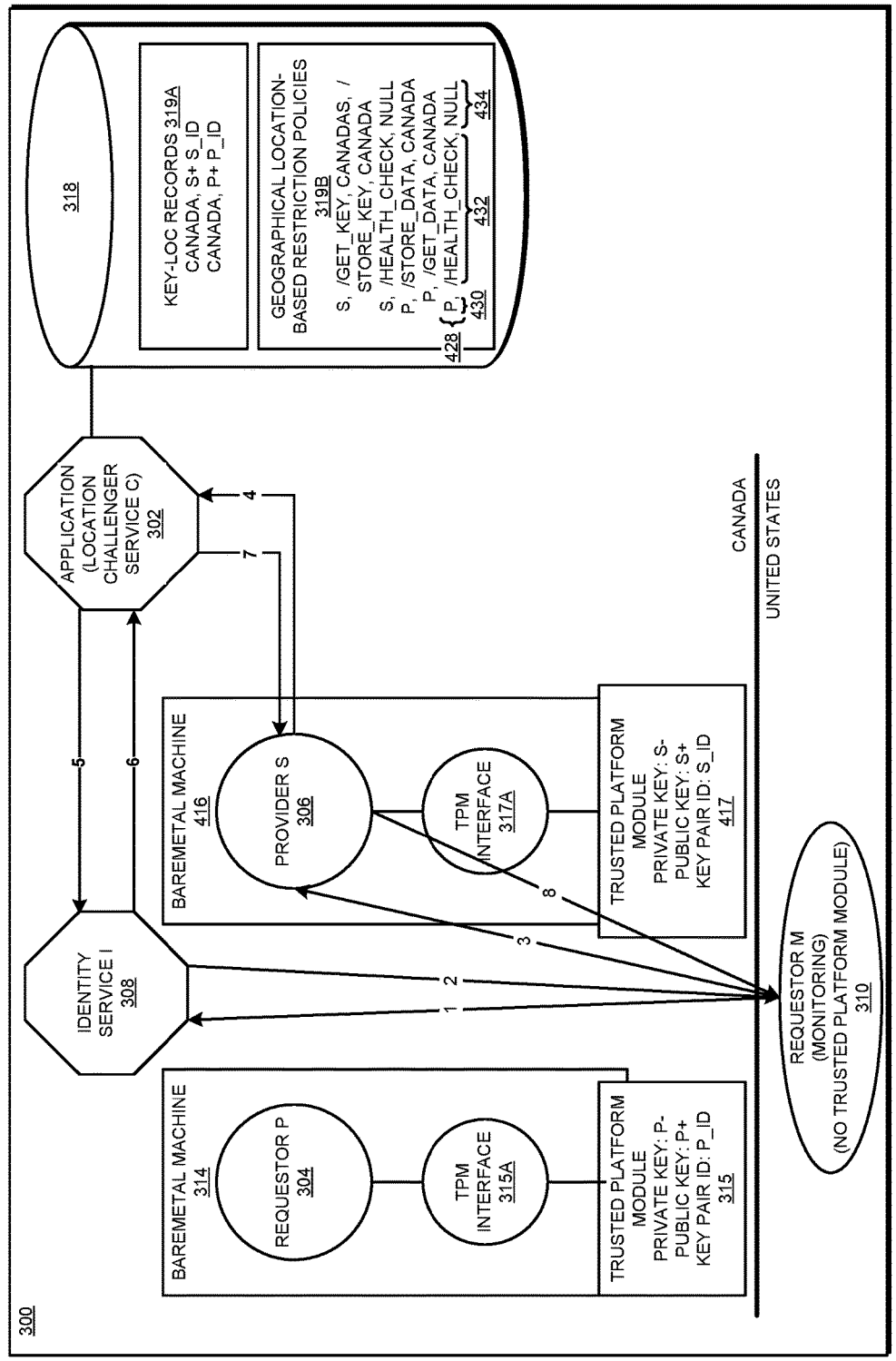
FIG. 4 depicts a block diagram of another example operation for enforcing locational restrictions on stateless transactions in accordance with an illustrative embodiment.

With reference to FIG. 4, this figure depicts a block diagram of another example operation for enforcing locational restrictions on stateless transactions in accordance with an illustrative embodiment. Configuration 300 is the same as in FIG. 3 and other elements of configuration 300 numbered the same as in FIG. 3 represent the same elements as in FIG. 3.

In the example operation depicted in FIG. 4, application 302 enforces a geographical restriction policy on a request from out-of-area requestor M (310).

Assume that requestor M is a legitimate requestor and presents appropriate credentials to identity service I (step 1). Identity service provides requestor M an auth code (step 2). Requestor M is operating in a machine that either does not include a TPM, or has not implemented the AIK pair obtaining procedure in the TPM. Accordingly, requestor M does not obtain the signed/encrypted request from a TPM before or after steps 1-2.

Requestor M sends the unsigned/unencrypted request (or a request signed/encrypted by a normal non-AIK private key) and auth code to provider S (step 3). Provider S sends the request and auth code to application 302 (step 4). Application 302 verifies requestor M's identity by sending the auth code to identity service I (step 5). Identity service I affirms the identity (step 6).

Before steps 5-6, during steps 5-6, or after steps 5-6, application 302 refers to repository 318 for location enforcement. Specifically, application 302 determines whether a key-loc record exists in key-loc records 319A in repository 318, which provides a location with an AIK+ key corresponding to a private key used on the request. For the reasons described above, no such key-loc record is present in records 319A. If requestor M used a non-AIK private key on the request, application 302 may still be able to decrypt the request or very the signature using known public-private key methods.

Application 302 attempts to find one or more policies in geographical restriction policies 319B that apply to the request from requestor M. For example, policy 428 provides that if a requestor 430, presents a request type 432, from anywhere regardless of any geographical boundary, the request is permitted. Assuming that the present request from requestor M is a HEALTH-CHECK type of request, the present request qualifies for processing. If the request is of a different type, the request is not permitted.

Accordingly, application 302 instructs provider S to process the request (step 7). Optionally, application 302 also provides the decrypted and verified request to provider S in step 7 as well. Provider S sends the data resulting from processing the request to requestor M (step 8). If the request is of a different type, provider S sends a "request denied" message to requestor M.

Figure 5:
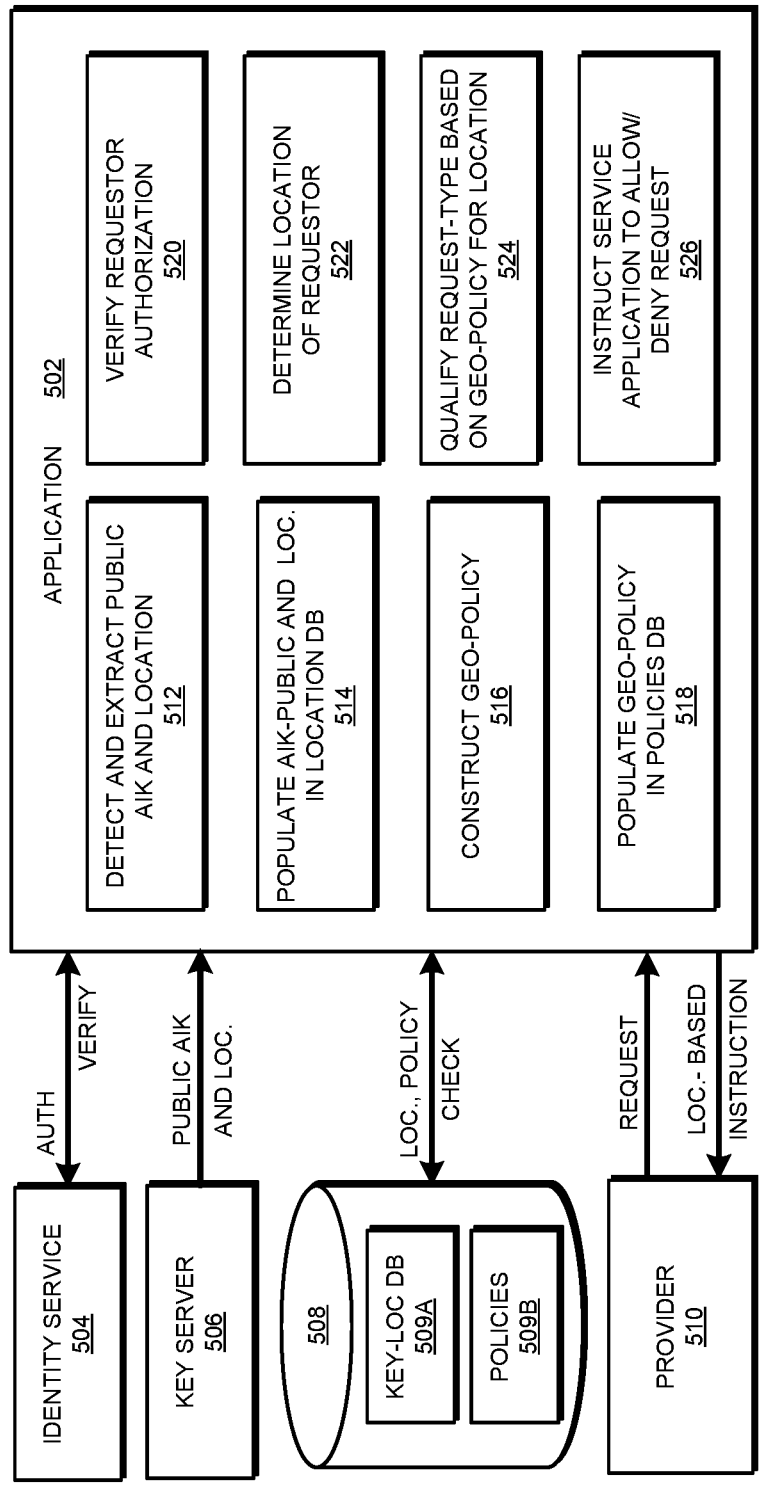
FIG. 5 depicts an example configuration for enforcing locational restrictions on stateless transactions in accordance with an illustrative embodiment.

With reference to FIG. 5, this figure depicts an example configuration for enforcing locational restrictions on stateless transactions in accordance with an illustrative embodiment. Application 502 can be implemented as application 302 in FIGS. 3 and 4.

Identity service 504 is an example of identity service 308 in FIG. 3. Key server 506 is an example of key server 140 in FIG. 1. Repository 508 is an example of repository 318 in FIG. 3. Key-loc database 509A includes a set of key-loc records, such as records 319A in FIG. 3. Policies 509B include geographical restriction policies, such as policies 319B in FIG. 3. Provide 510 is an example of provider 306 in FIG. 3.

Component 512 detects, extracts, or otherwise receives an AIK+ and the associated location from key server 506 when key server 506 is requested (by a requestor or a provider) to create an AIK pair. Component 514 populates key-loc database 509A with the received AIK+ and the associated location.

Component 516 enables the construction and management of a geographical restriction policy in policies 509B. A policy can be newly created, changed, deleted, or otherwise manipulated using component 516. Once a policy has been manipulated, component 518 stores the policy in policies database 509B.

Component 520 verifies a requestor's authorization by using the auth code with identity service 504 as described herein. Component 522 determines a location of the requestor using key-loc records 509A as described herein. Component 524 qualifies the request based on the location and request type using a policy from policies 509B as described in an example operation herein. Component 526 instructs provider 510 to allow or deny the request based on the conclusion computed by component 524.

With reference to FIG. 6, this figure depicts a flowchart of an example process for constructing a repository in accordance with an illustrative embodiment. Process 600 can be implemented in application 502 in FIG. 5.

The application receives a public component of an AIK pair, to wit, an AIK+, and an associated location (block 602). The application stores the public component and the location in a key-loc repository (block 604). The application may repeat bock 604 as many times as may be needed depending on the number of AIK+& locations received.

The application constructs, modifies, or otherwise manipulates a geographical restriction policy (block 606). The application saves the policy in a repository of geographical restriction policies (block 608). The application repeats blocks 606-608 as many times as needed to construct or modify ay number of policies. The application ends process 600 thereafter.

With reference to FIG. 7, this figure depicts a flowchart of an example process for enforcing locational restrictions on stateless transactions in accordance with an illustrative embodiment. Process 700 can be implemented in application 502 in FIG. 5.

The application receives a request from a provider (block 702). The application determines whether the requestor is an authorized requestor, e.g., by verifying an auth code supplied with the request (block 704). If the requestor is not authorized ("No" path of block 704), the application proceeds to block 718.

If the requestor is authorized ("Yes" path of block 704), the application determines whether the request uses an AIK (block 706). If the request uses an AIK ("Yes" path of block 706), the application uses the private AIK− based signature and/or the encryption of the request to identify a corresponding public AIK (block 708). The application determines a geographical location corresponding to the AIK+, e.g., by using the repository constructed by process 600 of FIG. 6 (block 710). The application determines a type of the verified/decrypted request (block 712).

Returning to block 706, if the request uses an AIK ("No" path of block 706), the application determines whether at least some request types are authorized without the location information (block 714). If no request types are authorized without the location information ("No" path of block 714), the application proceeds to block 718. If at least some request types are authorized without the location information ("Yes" path of block 714), the application proceeds to block 712 and determines the type of the request at hand.

The application determines whether the type of the request corresponds to a type that is authorized for the location determined at block 710 or the absence of location information as determined at block 706. If the request type does not correspond to any authorized request types for the location or absence of location, as the case may be, the application instructs the provider to reject or deny the request (block 718). The application ends process 700 thereafter.

If the request type does correspond to an authorized request type for the location or absence of location, as the case may be, the application instructs the provider to process the request (block 720). At block 720, the application may also send to the provider the verified/decrypted request for processing. The application ends process 700 thereafter.

Thus, a computer implemented method, system or apparatus, and computer program product are provided in the illustrative embodiments for enforcing locational restrictions on stateless transactions and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
creating new data of an Attestation Identity Key pair (AIK pair) from data of a hardware identifier of a hardware machine and data of a geographical location, the new data comprising a private AIK and a public AIK;
changing a state of a data storage device associated with a repository by storing the public AIK and the geographical location in the repository;
matching the public AIK with a key used to sign a data request;
executing a geographical restriction policy corresponding to the geographical location associated with the public AIK;
instructing, responsive to the geographical restriction policy determining that a type of the data request corresponds to an authorized request type from the geographical location, a service to process the data request.

2. The method of claim 1, further comprising:
failing to match any public AIK in the repository with a second key used to sign a second data request;
executing a second geographical restriction policy corresponding to requests lacking location information;
instructing, responsive to the second geographical restriction policy determining that a type of the second data request corresponds to a request type that is authorized without the location information, the service to process the second data request.

3. The method of claim 1, further comprising:
failing to match any public AIK in the repository with a second key used to sign a third data request;
executing a third geographical restriction policy corresponding to requests lacking location information;
instructing, responsive to the third geographical restriction policy determining that a type of the third data request does not correspond to any request type that are authorized without the location information, the service to deny the third data request.

4. The method of claim 1, further comprising:
matching a fourth public AIK in the repository with a fourth key used to sign a fourth data request;
executing a fourth geographical restriction policy corresponding to a fourth geographical location associated with the fourth public AIK;
instructing, responsive to the fourth geographical restriction policy determining that a type of the fourth data request does not correspond to any request type that are authorized from the fourth geographical location, the service to deny the fourth data request.

5. The method of claim 1, further comprising:
modifying an original keypair generation service, forming a modified keypair generation service, to generate the new data of the AIK pair, wherein the original keypair service only creates a pair comprising a public key and a private key, and wherein the modified keypair generation service further forms an association between the geographical location and the public key to form the public AIK.

6. The method of claim 5, wherein the geographical location is encoded in the public AIK.

7. The method of claim 1, further comprising:
configuring the hardware machine with the hardware identifier at a time of manufacturing the hardware machine, the hardware identifier being immutable; and
associating a location of provisioning the hardware machine with the hardware identifier as the geographical location.

8. The method of claim 7, further comprising:
configuring the hardware machine with a Trusted Platform Module (TPM), wherein the hardware identifier is an endorsement key of the TPM.

9. The method of claim 1, further comprising:
signing, using the private AIK, the data request, wherein the data request originates in the hardware machine.

10. The method of claim 1, further comprising:
encrypting, using the private AIK, the data request, wherein the data request originates in the hardware machine.

11. A computer usable program product comprising a computer-readable storage device, and program instructions stored on the storage device, the stored program instructions comprising:
program instructions to create new data of an Attestation Identity Key pair (AIK pair) from data of a hardware identifier of a hardware machine and data of a geographical location, the new data comprising a private AIK and a public AIK;
program instructions to change a state of a data storage device associated with a repository by storing the public AIK and the geographical location in the repository;
program instructions to match the public AIK with a key used to sign a data request;
program instructions to execute a geographical restriction policy corresponding to the geographical location associated with the public AIK;
program instructions to instruct, responsive to the geographical restriction policy determining that a type of the data request corresponds to an authorized request type from the geographical location, a service to process the data request.

12. The computer usable program product of claim 11, further comprising:
program instructions to fail to match any public AIK in the repository with a second key used to sign a second data request;
program instructions to execute a second geographical restriction policy corresponding to requests lacking location information;
program instructions to instruct, responsive to the second geographical restriction policy determining that a type of the second data request corresponds to a request type that is authorized without the location information, the service to process the second data request.

13. The computer usable program product of claim 11, further comprising:
program instructions to fail to match any public AIK in the repository with a second key used to sign a third data request;
program instructions to execute a third geographical restriction policy corresponding to requests lacking location information;
program instructions to instruct, responsive to the third geographical restriction policy determining that a type of the third data request does not correspond to any request type that are authorized without the location information, the service to deny the third data request.

14. The computer usable program product of claim 11, further comprising:
program instructions to match a fourth public AIK in the repository with a fourth key used to sign a fourth data request;
program instructions to execute a fourth geographical restriction policy corresponding to a fourth geographical location associated with the fourth public AIK;
program instructions to instruct, responsive to the fourth geographical restriction policy determining that a type of the fourth data request does not correspond to any request type that are authorized from the fourth geographical location, the service to deny the fourth data request.

15. The computer usable program product of claim 11, further comprising:
program instructions to modify an original keypair generation service, forming a modified keypair generation service, to generate the new data of the AIK pair, wherein the original keypair service only creates a pair comprising a public key and a private key, and wherein the modified keypair generation service further forms an association between the geographical location and the public key to form the public AIK.

16. The computer usable program product of claim 15, wherein the geographical location is encoded in the public AIK.

17. The computer usable program product of claim 11, further comprising:
program instructions to configure the hardware machine with the hardware identifier at a time of manufacturing the hardware machine, the hardware identifier being immutable; and
program instructions to associate a location of provisioning the hardware machine with the hardware identifier as the geographical location.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A computer system comprising a processor, a computer-readable memory, and a computer-readable storage device, and program instructions stored on the storage device for execution by the processor via the memory, the stored program instructions comprising:
program instructions to create new data of an Attestation Identity Key pair (AIK pair) from data of a hardware identifier of a hardware machine and data of a geographical location, the new data comprising a private AIK and a public AIK;
program instructions to change a state of a data storage device associated with a repository by storing the public AIK and the geographical location in the repository;
program instructions to match the public AIK with a key used to sign a data request;
program instructions to execute a geographical restriction policy corresponding to the geographical location associated with the public AIK;
program instructions to instruct, responsive to the geographical restriction policy determining that a type of the data request corresponds to an authorized request type from the geographical location, a service to process the data request.

* * * * *